Dec. 22, 1959     H. E. DARLING     2,918,619
MEASURING APPARATUS
Filed Oct. 17, 1955     2 Sheets-Sheet 1

INVENTOR
Horace E. Darling
BY
Curtis Morris + Safford
ATTORNEYS

Dec. 22, 1959  H. E. DARLING  2,918,619
MEASURING APPARATUS
Filed Oct. 17, 1955  2 Sheets-Sheet 2

INVENTOR
Horace E. Darling
BY
Curtis Morris + Safford
ATTORNEYS

United States Patent Office 2,918,619
Patented Dec. 22, 1959

2,918,619

MEASURING APPARATUS

Horace E. Darling, North Attleboro, Mass., assignor to The Foxboro Company, Foxboro, Mass.

Application October 17, 1955, Serial No. 540,783

2 Claims. (Cl. 323—66)

This invention relates to apparatus used for measuring small direct-current voltages. More particularly, this invention relates to self-regulating voltage standards especially adapted to be employed with rebalanceable instruments, e.g. of the slide-wire type, used for measuring voltages such as are supplied by a thermocouple.

Rebalanceable slide-wire devices have been used for some time now in the field of industrial instrumentation for the measurement, recording, and control of process conditions, such as temperature, which can be represented by an unknown voltage. Broadly speaking, these devices operate by comparing the unknown voltage with a known voltage of adjustable magnitude. The "error" signal resulting from this comparison may be used to energize control mechanisms arranged to vary the known voltage automatically, for example by changing the setting of the slide-wire resistor until the known voltage is equal to the unknown voltage. When the error signal has been reduced substantially to zero, the adjusted known voltage provides an indication of the magnitude of, or variation in, the condition being measured.

The accuracy of measurement or control provided by such apparatus is, of course, directly dependent upon the accuracy of calibration of the known voltage. Because of the paramount importance of accurate calibration, rebalanceable slide-wire instruments have generally included a built-in calibration standard, typically a highly stable source of E.M.F. commonly referred to as a "standard cell," for assuring a reasonably precise determination of the magnitude of the known voltage.

However, the standard cell is by its nature subject to deterioration after relatively short periods of usage, and its fragility and temperature-sensitivity present problems in practical usage. Furthermore, the output voltage of a standard cell remains stable only when there is negligible or extremely low current drain, and therefore the practice in the past has been to use the standard cell to calibrate or "standardize" a secondary source of E.M.F. This secondary source, e.g. such as an electronic power supply, must have a relatively high power capacity since it is used to supply the required electrical power of known voltage to the rebalanceable comparison network. In such arrangements, the standard cell has been used to calibrate the secondary comparison source either periodically or continuously, but in either event, to insure a reasonable level of stability, the rebalanceable slide-wire instruments now commonly in use commercially include special, and generally quite complex, internal standardization devices or circuitry.

Although such rebalanceable slide-wire instruments have been used extensively in industry, there have been several long standing limitations to the use of such equipment, in addition to the high cost associated with their complexity. In those instruments using periodic standardization, for example, consistent high accuracy generally cannot be attained in measurement systems requiring fast response to changed conditions, since the secondary comparison voltage may fluctuate or "drift off" between the times of standardized accuracy; any measurement made during such "non-standardized" periods will accordingly be inaccurate to the extent of the error in the secondary comparison voltage. In apparatus using continuous standardization, on the other hand, the number of circuit elements such as tubes, capacitors, etc., required to effectuate close control tends to contribute to unreliability of operation, through the greater probability of breakdown or instability ensuing from the multiplicity of components. Consequently, with such equipment, there is an excess of "down-time" due to breakdowns, and the maintenance expenses are undesirably high.

In accordance with the present invention, these and other disadvantages are avoided by a highly accurate voltage standard of simple design, comprising a unique combination of passive elements. This standard is capable of providing sufficient power, by itself, to energize the rebalanceable comparison network of a slide-wire measuring instrument, and yet is sufficiently stable in operation to obviate the need for standardization by a standard cell or similar device.

In a preferred embodiment of the invention described herein, this voltage standard is used to supply a voltage of known magnitude to a rebalanceable potentiometer network forming part of a temperature measuring system. The unknown voltage is supplied by a thermocouple located in a region the temperature of which is to be measured, and the direct-current "unbalance" signal from the potentiometer network is fed to the input of a second-harmonic converter arranged to produce an alternating-current output signal only when a direct-current signal is applied to its input. The alternating-current output signal is appropriately amplified and applied to a reversible drive motor mechanically connected to rebalance the potentiometer network, and by its motion to indicate variations in the temperature of the thermocouple.

Accordingly, it is an object of this invention to provide voltage standard apparatus of the type described that is superior to such apparatus available heretofore. It is a further object of this invention to provide voltage measuring apparatus that is simple in construction, adapted for long periods of operation without servicing, and highly accurate even when subjected to wide variations in supply line voltage or ambient temperature. Other objects, aspects and advantages of the present invention will be in part pointed out in, and in part apparent from, the following description considered together with the accompanying drawings in which:

Figure 1:
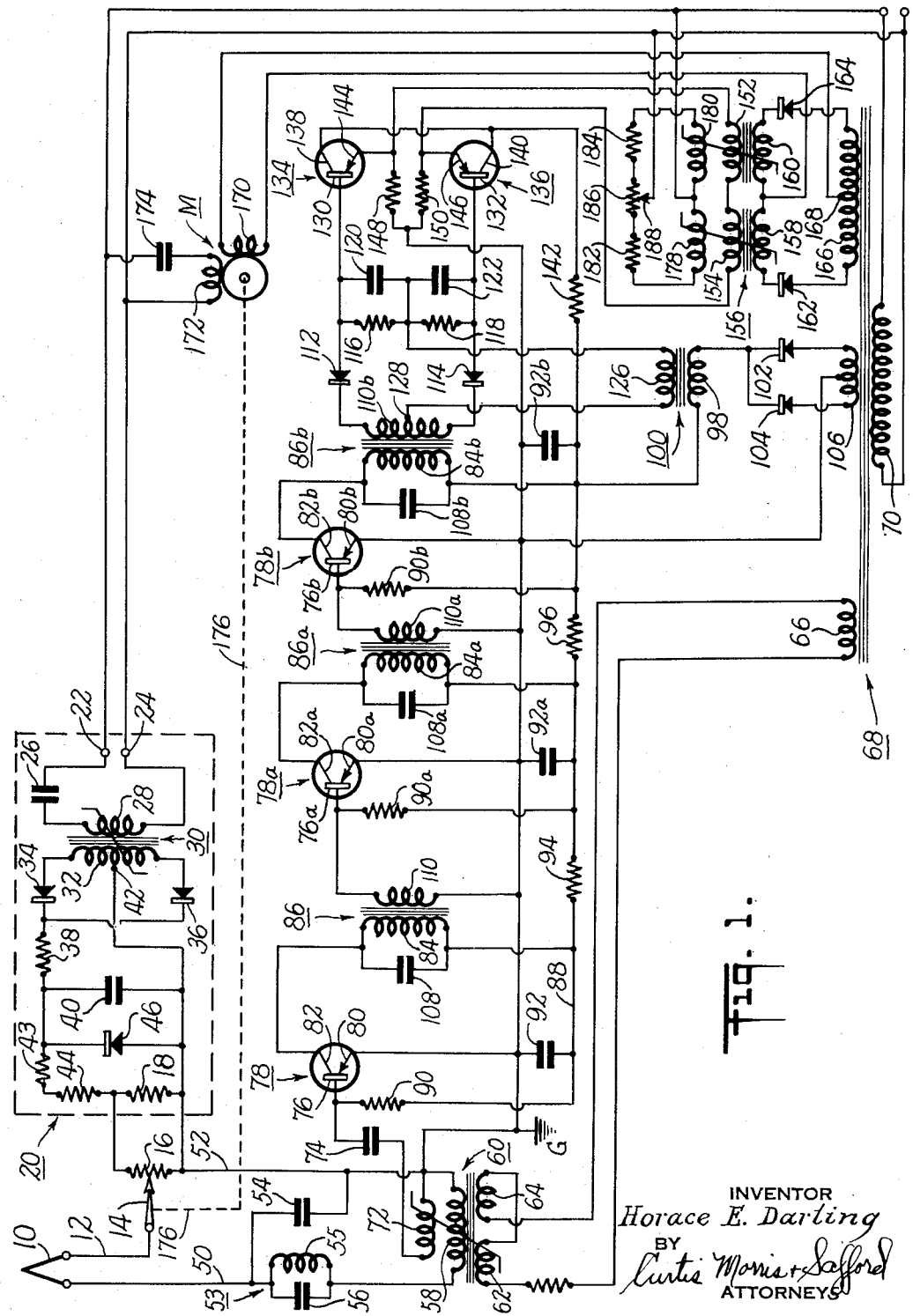
Figure 1 is a schematic diagram of a temperature measuring system including apparatus in accordance with the present invention.

Referring now to the upper left hand corner of Figure 1, there is shown a thermocouple 10 which is located in a region the temperature of which is to be measured. This thermocouple is connected by one lead 12 to the movable arm 14 of a potentiometer 16, which may, for example, be arranged in the form of a helix. The remote ends of this potentiometer are connected to corresponding ends of an output resistor 18 forming part of a self-regulating D.-C. voltage standard indicated within the block 20. The output voltage accordingly developed across the potentiometer 16, between the movable arm 14 and the upper terminal thereof, is effectively in series with the voltage developed by the thermocouple 10 and of opposite polarity. The difference between these two voltages is fed to detection and amplification equipment, to be described, to energize a drive motor which positions the arm 14 in a manner such that these two voltages are maintained substantially in balance at all times.

The voltage standard 20 is furnished with energizing potential through two input terminals 22 and 24 which are connected to an alternating-current supply line, e.g. 115 volts, 60 cycles. One of these terminals 22 is connected through a current-limiting capacitor 26 to one end of the primary winding 28 of a saturable reactor generally indicated at 30, with the remote end of this winding connected to the other input terminal 24. This saturable reactor 30 includes a secondary winding 32 wound on the same core as the primary winding; the core may, for example, be of toroidal shape, and the core construction may be in general conformance with that disclosed in my copending application Serial No. 507,201 filed on May 10, 1955.

The remote ends of the secondary winding 32 are connected together through two rectifiers 34 and 36, which preferably are of the dry type (e.g. the type known commercially as 1N93). The common point between these two rectifiers is connected through a voltage dropping resistor 38 to one plate of a filter capacitor 40, the other plate of which is returned to the center tap 42 of the secondary winding 32.

Figure 2:
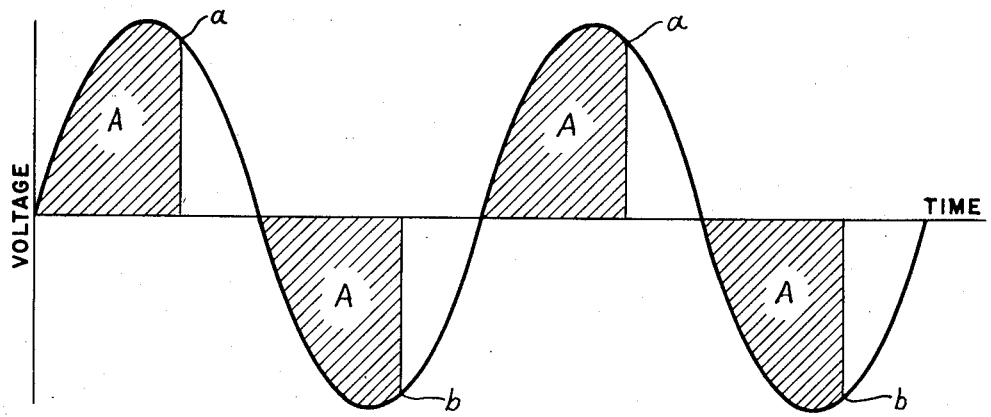
Figure 2 is a curve representative of an alternating supply voltage.

The operation of the portion of the circuitry described immediately above is better understood by reference to Figure 2, which represents two cycles of the sinusoidal variation of the supply potential furnished to the input terminals 22 and 24. As this potential increases from zero in a positive direction (at the left hand side of Figure 2), magnetizing current will flow through the primary winding 28, and this current will increase in magnitude until the flux thereby produced saturates the reactor core (i.e. assuming the amplitude of the supply voltage is sufficiently great to produce saturation). This point of saturation is represented on the curve by letter "$a$." When the core saturates, the voltage across the primary winding is immediately reduced effectively to zero so that essentially the full line voltage then appears across the current-limiting capacitor 26.

The core of the reactor 30 remains saturated until the supply potential again returns to zero. And as this potential increases negatively, the core again will saturate (e.g. at the point indicated by the letter "$b$") when the magnetizing current has reached the saturation amplitude in the reverse direction.

The point in the cycle at which the core saturates will, for a given supply voltage amplitude, be determined by the maximum amount of flux which the reactor core can support. For most practical purposes, this maximum flux is proportional to the cross hatched area (identified as "A") under the curve of Figure 2. Any change in the amplitude of the supply voltage will cause a corresponding change in the point at which saturation occurs in the cycle, but the area A will remain nearly constant regardless of supply voltage amplitude. Consequently, the open circuit voltage developed in the secondary winding 32 will have a root-mean-square value which is nearly independent of the amplitude of the supply voltage.

The alternating signal in the secondary winding 32 passes through the full-wave rectifier circuit formed by the two rectifiers 34 and 36, and produces a flow of direct current through the voltage dropping resistor 38, a compensating resistor 43 (the function of which will be described later), a second voltage dropping resistor 44, and the output resistor 18. All of these resistors, with the exception of the compensating resistor 43, are of the temperature-insensitive type, i.e. their electrical resistance remains essentially constant with changes in temperature. The filter capacitor 40 absorbs high-frequency fluctuations in the current, and thus helps to maintain a nearly uniform voltage across the output resistor.

Connected in parallel with the filter capacitor 40 is a silicon junction diode 46 (e.g. the type known commercially as A5B, produced by National Union). This diode operates, in combination with the saturable reactor arrangement described, to assure that the direct-current voltage developed across the output resistor 18 is maintained virtually constant. For example, tests have shown that line voltage variations from 90 to 130 volts produce an output voltage variation of less than 0.05%, and normal ambient temperature changes produce an output voltage variation significantly less.

Figure 3:
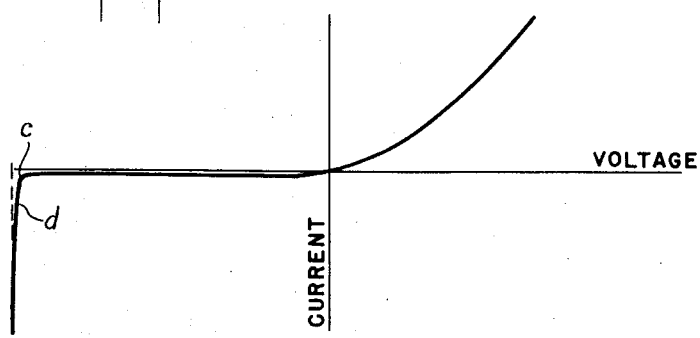
Figure 3 is a curve demonstrating the voltage-current characteristics of a silicon rectifier.

The functioning of this portion of the circuitry is best understood by reference to Figure 3 which shows the current through a silicon diode as a function of the voltage drop across the diode. It can be seen that a silicon diode conducts current in the "forward" direction (i.e. positive applied voltage) in the usual manner, in that the current gradually increases as the applied voltage is increased. In the reverse direction (i.e. negative applied voltage), however, the diode conducts essentially no current as the voltage is increased from zero negatively, until the voltage reaches a critical magnitude (designated in the drawing at $c$). As the voltage is increased beyond $c$, the current increases very rapidly, represented by the nearly vertical portion of the curve.

In practice, the circuitry is so arranged that the voltage supplied to the diode 46 is slightly greater than the critical magnitude, and therefore the diode conducts a moderate amount of current in the reverse direction, e.g. as indicated in the drawing by the letter "$d$." It will be apparent that if the voltage fed to the diode by the rectifiers 34 and 36 increases, the current through the diode will tend to increase correspondingly. This increased current will cause a larger voltage drop across the dropping resistor 38 and hence the voltage across the diode will tend to be maintained at its original value $d$. Conversely, if the voltage fed to the diode decreases, the voltage drop across the resistor 38 will diminish and thus tend to hold the diode voltage constant.

It has been found that the combination of the saturable reactor 30 and the diode 46 produces surprisingly superior voltage regulation characteristics, and is especially advantageous as a voltage standard for precision measurement purposes as shown herein. One important practical advantage of this arrangement is that it is formed entirely of passive elements, and contains no voltage sources or vacuum tubes. The standard thus may be permanently packaged, e.g. by potting, etc., at the time of manufacture, and is uniquely adapted for use with tubeless measuring instruments.

A change in ambient temperature surrounding a silicon diode will alter its voltage-current characteristics slightly, but this effect is negligible in many applications. Furthermore, this effect can be greatly minimized where desired by utilizing selected silicon diodes. In this regard, it has been found that the voltage-current characteristics of certain selected commercially available diodes (e.g. National Union A5B) vary with ambient temperature in a manner shown in Figure 4, wherein curve $e$ represents, in magnified form, the nearly vertical portion of the diode characteristics at 20° C. and curve $f$ represents these characteristics of the same diode at 80° C. It will be noted that curves $e$ and $f$ cross over in the region indicated at $d$; corresponding curves (not shown) for other temperatures also pass through this same region, and essentially through a common point. By arranging the circuitry in such a manner that the diode output voltage falls within this cross-over region, and preferably on the common point of intersection, there will be very little effect on the diode output voltage due to changes in ambient temperature.

Figure 4:
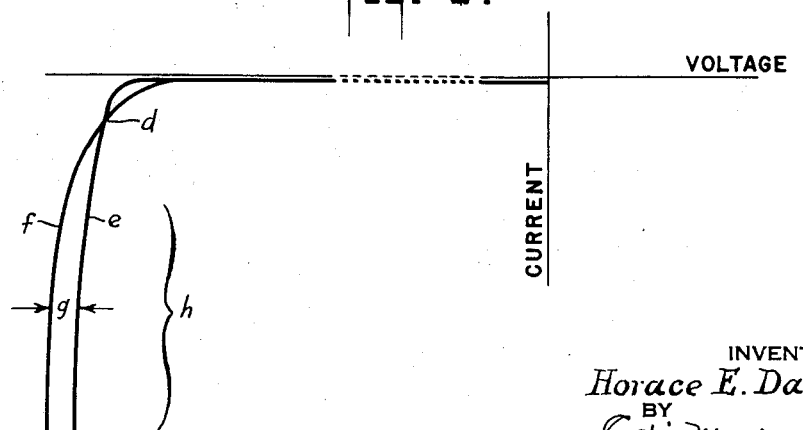
Figure 4 shows the effect of temperature on the voltage-current characteristics of a silicon rectifier.

For run-of-the-mill silicon diodes, the angle of crossover between its temperature characteristic curves, such as those designated $e$ and $f$ in Figure 4, may however be relatively large. Since as a practical matter, the diode operating voltage frequently cannot be set precisely at the point of cross-over of these curves, a large angle of cross-over makes it difficult to maintain the desired regulation in the face of ambient temperature changes. Also, in some applications it may be necessary to operate the diode at a voltage greater than that at the cross-over point.

As may be noted from the curves shown in Figure 4, the voltage differential g between the two curves is relatively constant over a large portion of the operating range (indicated at h) of the diode for voltages greater than the cross-over voltage. (Insofar as this portion of the curves is concerned, the run-of-the-mill diodes are quite similar to the selected diodes previously referred to.) The magnitude of this differential may be of the order of about 2% of the diode critical voltage for a temperature variation as indicated above.

It has been found that, for diodes which are to be operated within this latter region h, the effects of ambient temperature variations are substantially eliminated by the compensating resistor 43. This resistor has a positive temperature coefficient, so that its electrical resistance increases with increasing temperature. And since the diode operating voltage increases with increasing ambient temperature, the corresponding increase in electrical resistance of the compensating resistor 43 tends to maintain the output voltage at a constant value because of the resulting increased voltage drop developed across the compensating resistor.

In a unit found to perform satisfactorily, the compensating resistor 43 was formed of No. 38 copper wire having a temperature coefficient of about .2% per degree Fahrenheit, and having a nominal total resistance of about 45 ohms. In this unit, the total resistance of the voltage dropping resistor 44 and the parallel combination of the output resistor 18 and the potentiometer 16 was approximately 1000 ohms. A performance test of this unit showed that its output voltage varied only 0.008% for a temperature variation of 75° F. to 160° F., and that the average zero drift over a substantial period of time was negligible.

It will be apparent that when a properly selected diode is used and operated at its cross-over point as described hereinbefore, it will not be necessary in most applications to employ the compensating resistor 43, i.e. the diode will be connected directly to the voltage dropping resistor 44.

As explained above, the voltage developed by the thermocouple 10 is balanced against the voltage picked off from the slide-wire resistor 16 by the movable arm 14. Any unbalance voltage resulting from this comparison is fed along two lines 50 and 52 and through a filter generally indicated at 53 to the input winding 58 of a second-harmonic converter generally indicated at 60. The filter 53 includes a shunt capacitor 54 and a tuned band-rejection network comprising an inductor 55 in parallel with a capacitor 56; this filter serves to isolate the thermocouple elements from the alternating signals in the converter 60, and also to minimize the effects of induced voltages from neighboring electrical equipment.

The converter 60 may, for example, be similar to that shown and described in the co-pending application of Bowditch and Olsen Serial No. 455,968, filed on September 14, 1954, and may include a core construction such as is described in my above-mentioned copending application. The input winding 58 is magnetically coupled to two excitation windings 62 and 64 which are connected in series and energized from a secondary winding 66 of a power transformer generally indicated at 68. The primary winding 70 of this power transformer is connected to the usual supply line, e.g. 115 volts, 60 cycles.

As is well known, when a direct current flows through the input winding 58 of the second-harmonic converter 60, there will be developed in the signal winding 72 an alternating-current signal the frequency of which is twice that of the supply line frequency. Moreover, the amplitude of this signal will be proportional to the magnitude of the direct current, and its phase is determined by the direction of flow of direct current through the input winding.

The alternating-current signal developed on the signal winding 72 is fed from one end of this winding through a coupling capacitor 74 to the base electrode 76 of a transistor generally indicated at 78. The emitter electrode 80 of this transistor is connected to the common ground G, to which the other end of the signal winding 72 also is connected, and the collector electrode 82 is connected through the primary winding 84 of an interstage coupling transformer generally indicated at 86 to a supply line 88 carrying the usual negative transistor energizing potential. The base electrode 76 of the transistor 78 is connected through a resistor 90 to the supply line 88, and a filter capacitor 92 is bridged between this line and the common ground G to remove supply voltage fluctuations.

The supply line 88 is, in turn, connected through two filter resistors 94 and 96 and the primary winding 98 of a transformer generally indicated at 100 to two rectifiers 102 and 104 forming part of a full-wave rectifier circuit. This circuit is of conventional design, and includes a secondary winding 106 of the power transformer 68, the center-tap of which is connected to the common ground G.

A capacitor 108 is connected in parallel with the primary winding 84 of the coupling transformer 86 to tune this transformer to the double-frequency signal produced by the second-harmonic converter 60. The alternating-current signal induced in the secondary winding 110 of the transformer 86 is fed through two more cascaded transistor amplifier stages 78a and 78b. Both of these latter transistor stages are connected in a manner similar to that of the one just described, and in the drawing like circuit elements bear identical reference numerals with differentiating suffixes.

The amplified alternating-current signal developed in the secondary winding 110b of the third inter-stage coupling transformer 86b is fed through a phase-sensitive detection circuit to produce a direct-current signal having a polarity determined by the phase of the alternating-current signal produced by the second-harmonic converter 60. For this purpose, the remote ends of the secondary winding 110b are connected together through two rectifiers 112 and 114 in series with two load resistors 116 and 118; each of these latter resistors is connected in parallel with a respective filter capacitor 120 and 122. The common point 124 between the load resistors is returned through the secondary winding 126 of the transformer 100 to a center tap 128 in the coupling transformer secondary winding 110b.

As described above, the primary winding 98 of the transformer 100 is connected in series with the supply line 88, and so carries the ripple current produced in the output of the full-wave rectifier circuit previously mentioned. Consequently, there is induced in the secondary winding 126 of this transformer a signal having a frequency double that of the alternating-current supply frequency and this signal serves in the usual way as a phase reference to control the polarity of the direct-current voltage developed across the filter resistors 116 and 118 by the amplified alternating-current signal in the secondary winding 110b of the coupling transformer 86b.

The remote ends of the load resistors 116 and 118 are connected, respectively, to the base electrodes 130 and 132 of a pair of transistors 134 and 136 forming a balanced stage of amplification. The collector electrodes 138 and 140 of these transistors are connected together and, through a resistor 142, to the supply line 88 to provide energizing potential for the transistors. The emitter electrodes 144 and 146 are connected together through two resistors 148 and 150 having equal ohmic resistances, and the common point of which is returned to the system ground G.

It will be apparent that when there is no net voltage across the load resistors 116 and 118, the two transistors 134 and 136 will conduct equal amounts of current, and thus there will be no potential difference between their emitter electrodes 144 and 146. However, if the phase-sensitive detector develops a direct-current signal across the load resistors 116 and 118, one of the transistors (which one depending upon the polarity of the signal) will conduct more heavily than the other, and a corresponding voltage difference will be developed between the emitter electrodes.

The emitter electrodes 144 and 146 also are connected together through the signal windings 152 and 154 of a magnetic amplifier generally indicated at 156. Hence, any potential difference between these electrodes will cause a corresponding flow of direct current through these windings, the direction of flow being determined by the polarity of the direct-current signal produced by the phase-sensitive detector.

The magnetic amplifier 156 includes a pair of series-connected output windings 158 and 160, the remote ends of which are connected through respective rectifiers 162 and 164 to corresponding ends of a secondary winding 166 of the power transformer 68. The center-tap 168 of this winding is returned through one winding 170 of a two-phase motor M to the common connection of the output windings 158 and 160. The other winding 172 of this motor is connected in the usual way through a phase-shifting capacitor 174 to the A.-C. supply line, and the motor shaft is mechanically interconnected by a linkage 176 to the movable arm 14 of the slide-wire potentiometer 16.

The magnetic amplifier also is provided with a pair of series-connected bias windings 178 and 180, the remote ends of which are connected together through two resistors 182 and 184, of equal ohmic resistance, and a balancing potentiometer 186. The movable arm 188 of this potentiometer is returned to one side of the A.-C. supply line, the other side of which is connected to the common point between the bias windings. The alternating current flow through these windings produces corresponding flux in the cores of the magnetic amplifier which biases these cores to the desired operating region of the magnetic material. The potentiometer 186 provides a means of controlling the relative current flow through the two bias windings and so permits any differences in the magnetic amplifier windings to be balanced out.

The magnetic amplifier operates as follows: Assuming first that no current is flowing through the signal windings 152 and 154, the impedance to current flow presented by the output windings 158 and 160 will be equal, and hence the current through the motor winding 170 will be in the form of half-way pulses of the same polarity and equal amplitude. In effect, this current comprises a steady direct-current component with a substantial 120 cycle component superimposed. Thus, the motor will not rotate, but the 120 cycle component causes the motor to oscillate slightly; this oscillation greatly minimizes the effects of static friction and maintains the motor in sensitive condition ready for immediate rotary movement upon receipt of a signal from the magnetic amplifier.

When a direct current flows through the signal windings 152 and 154, it correspondingly increases the impedance of one output winding (which one depending upon the direction of current flow) and decreases the impedance of the other output winding. Consequently, the current flowing through the motor winding 170 will be in the form of half-wave pulses of the same polarity, but alternately of different amplitude. This wave form contains a 60 cycle component, the magnitude of which is determined by the magnitude of direct current flow through the signal windings 152 and 154, and the phase of which is determined by the direction of such current flow.

The 60 cycle component activates the motor M causing it to rotate and move the arm 14 of the slide-wire potentiometer 16 in a direction to balance the voltage picked off from the reference standard 20 with the thermocouple output voltage. The motor continues to rotate until these voltages are substantially at null balance, at which time current flow through the input winding 58 of the second-harmonic converter 60 ceases, and consequently no 60 cycle power component will be fed to the winding 170 of the motor M. It may be noted that the direct-current component passing through the motor winding 170 serves as an effective dynamic brake, and brings the motor M to a rapid stop when the 60 cycle component disappears. It will be apparent that various recording or control apparatus (not shown) may be connected to the motor M or the linkage 176 for purposes of utilizing the temperature measurement data represented by the positioning of the motor.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as to meet the requirements of particular applications, it being understood that various modifications may be made without departing from the scope of the invention as limited by the prior art.

I claim:

1. A self-regulating direct-current voltage standard comprising, in combination, an input circuit to be connected to a source of direct-current voltage, a silicon current-control element connected across said input circuit and in series with a voltage-dropping resistance, said silicon element being connected in the reverse sense with respect to said direct-current voltage and arranged to operate in the steep negative voltage portion of its voltage-current characteristic curve, said silicon element being of the type wherein said negative voltage portion of its characteristic curve at one ambient temperature crosses the corresponding portion of its characteristic curve at another ambient temperature, said silicon element further being arranged to operate in the region of cross-over of said curves whereby to minimize the effects of ambient temperature on the output voltage of said standard, and an output load coupled across said silicon element.

2. A self-regulating direct-current voltage standard comprising, in combination, an input circuit to be connected to a source of direct-current voltage, a silicon current-control element connected across said input circuit in series with a voltage-dropping resistance, said silicon element being connected in the reverse sense with respect to said direct-current voltage, said silicon element being arranged to operate in the steep negative voltage portion of its voltage-current characteristic and in the region thereof where the characteristic curve at one ambient temperature is displaced from the characteristic curve at another ambient temperature by a substantially constant voltage differential regardless of the amount of current passing through said element, an output circuit including a load resistance connected across said silicon element, and a compensating resistor connected in said output circuit with said load resistance, said compensating resistor being formed of material having a temperature coefficient that is substantially different than the temperature coefficient of said load resistance and being arranged to effectively compensate for the changes in voltage across said silicon element due to variations in ambient temperature.

References Cited in the file of this patent

UNITED STATES PATENTS

| 2,421,560 | Haynes | June 3, 1947 |
| 2,714,702 | Shockley | Aug. 2, 1955 |
| 2,739,282 | Evans | Mar. 20, 1956 |
| 2,763,827 | Evans | Sept. 18, 1956 |

FOREIGN PATENTS

| 582,743 | Germany | Aug. 22, 1933 |